(12) United States Patent
Chen et al.

(10) Patent No.: US 9,215,621 B2
(45) Date of Patent: Dec. 15, 2015

(54) AIR-TIME FAIR TRANSMISSION REGULATION WITHOUT EXPLICIT TRAFFIC SPECIFICATIONS FOR WIRELESS NETWORKS

(75) Inventors: Yingwei Chen, Briarcliff Manor, NY (US); Richard Chen, Croton-On-Hudson, NY (US); Ruediger Schmitt, Maplewood, NJ (US); Saishankar Nandagopalan, Tarrytown, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1163 days.

(21) Appl. No.: 11/719,774

(22) PCT Filed: Nov. 16, 2005

(86) PCT No.: PCT/IB2005/053791
§ 371 (c)(1),
(2), (4) Date: May 21, 2007

(87) PCT Pub. No.: WO2006/054256
PCT Pub. Date: May 26, 2006

(65) Prior Publication Data
US 2009/0147765 A1 Jun. 11, 2009

Related U.S. Application Data

(60) Provisional application No. 60/630,089, filed on Nov. 22, 2004.

(51) Int. Cl.
*H04J 1/16* (2006.01)
*H04W 4/00* (2009.01)
*H04J 3/16* (2006.01)
*H04W 28/14* (2009.01)
*H04L 12/54* (2013.01)
*H04L 12/851* (2013.01)
*H04L 12/807* (2013.01)
*H04L 12/801* (2013.01)
*H04L 12/861* (2013.01)

(52) U.S. Cl.
CPC ........... *H04W 28/14* (2013.01); *H04L 12/5693* (2013.01); *H04L 47/24* (2013.01); *H04L 47/27* (2013.01); *H04L 47/29* (2013.01); *H04L 49/90* (2013.01)

(58) Field of Classification Search
CPC ... H04L 12/5693; H04L 29/06; H04L 47/245; H04W 88/185
USPC ............ 370/412, 79, 229, 329, 468; 340/825; 395/200
See application file for complete search history.

(56) References Cited

U.S. PATENT DOCUMENTS 5,726,640 A * 3/1998 Jones et al. ............... 340/825.22
5,881,245 A * 3/1999 Thompson .................... 709/219
6,473,399 B1 * 10/2002 Johansson et al. ............ 370/229

(Continued)

FOREIGN PATENT DOCUMENTS

EP 0872979 A2 10/1998

*Primary Examiner* — Melanie Jagannathan
(74) *Attorney, Agent, or Firm* — Larry Liberchuk

(57) ABSTRACT

A system and method are provided for non-transmission specification fair air-time, NT-AirFair, allocation control by tracking the transmission time (308) consumed by each link to detect any increase and enforcing air-time allocation (309) based on the pattern of usage derived therefrom.

30 Claims, 3 Drawing Sheets

(56) References Cited

U.S. PATENT DOCUMENTS

| | | | |
|---|---|---|---|
| 6,725,270 B1 * | 4/2004 | Yu et al. | 709/229 |
| 6,822,969 B2 * | 11/2004 | Love et al. | 370/444 |
| 7,088,702 B2 * | 8/2006 | Shvodian | 370/348 |
| 7,136,392 B2 * | 11/2006 | Wentink | 370/445 |
| 2004/0170186 A1 | 9/2004 | Shao | |
| 2004/0177087 A1 * | 9/2004 | Wu et al. | 707/102 |

\* cited by examiner

AIR-TIME FAIR TRANSMISSION REGULATION WITHOUT EXPLICIT TRAFFIC SPECIFICATIONS FOR WIRELESS NETWORKS

The present invention relates to transmission control in a wireless multimedia communication system.

In wireless networks, multiple nodes share access to the communication medium. Various Media Access Control (MAC) mechanisms have been designed to enable sharing the medium efficiently. Airtime fair (or AirFair) transmission control has been layered on top of MAC protocols as an additional mechanism that ensures each traffic flow of its allocated air time, on an as-needed basis, regardless of the conditions of other links. This approach prevents the unfair allocation of transmission time that otherwise would accrue to stations with good links. In other words, with current AirFair control technology if a link is experiencing much longer transmission time for each packet due to link degradation, the link can exceed its allocated transmission time only if there is surplus airtime unused by other stations. This is important for high-quality video transmission over wireless networks, because this type of video traffic is high data rate, delay intolerant and sensitive to data losses.

One limitation of existing AirFair technology is that it requires the application layer to specify and pass to the admission control and scheduling modules information about each traffic flow, such as bit rate and delay tolerance. In practice, such information is not always available, and the interface for passing such information remains to be standardized and implemented.

The system and method of the present invention provide a non-TSPEC (traffic specification) fair air-time allocation control mechanism that overcomes the limitations of existing AirFair technologies. The system and method of the present invention perform tracking the transmission time consumed by each link, detection of any increase in such transmission time, and enforcement of airtime allocation based on the pattern of usage derived therefrom.

Further, the system and method of the present invention enforces airtime allocation without requiring any traffic specification (TSPEC) to be made available, thereby enhancing the quality of service feature for a wide range of wireless devices and applications.

In the following description, by way of explanation and not limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details.

An important component of the many QoS network architectures proposed is the packet scheduling algorithm employed by network components to determine the order of forwarding packets over a shared output link for various input flows. The packet scheduler determines the order in which packets of the various independent flows are forwarded on a shared output link. One of the simplest algorithms is First In First Out (FIFO) in which the order of arrival of packets also determines the order in which they are forwarded over the output link. While almost trivial to implement, FIFO clearly cannot enforce QoS guarantees because it allows rogue flows to capture an arbitrary fraction of the output bandwidth.

In general, a packet scheduler should have the following properties:

1. Fairness The packet scheduler should provide some measure of isolation between multiple flows competing for the same shared output link. In particular, each flow should get its fair share of the available bandwidth, and this share should not be affected by the presence and (mis)behavior of other flows. For example, this share may be a pre-allocated amount of bandwidth that should be available to the flow, regardless of other flow activity.

2. Bounded Delay Interactive applications such as video and audio conferencing require the total delay experienced by a packet in the network to be bounded on an end-to-end basis. The packet scheduler decides the order in which packets are sent on the output link, and therefore determines the queuing delay experienced by a packet at each intermediate step in the network and hence determines the total delay.

3. Low complexity The time spent choosing the next packet to schedule must be small and independent of the number of flows n. Equally important, the scheduling algorithm must be amenable to an efficient implementation in a wireless device whose resources are necessarily limited.

The system and method of the present invention possess all three characteristics, in varying degrees.

Figure 1:
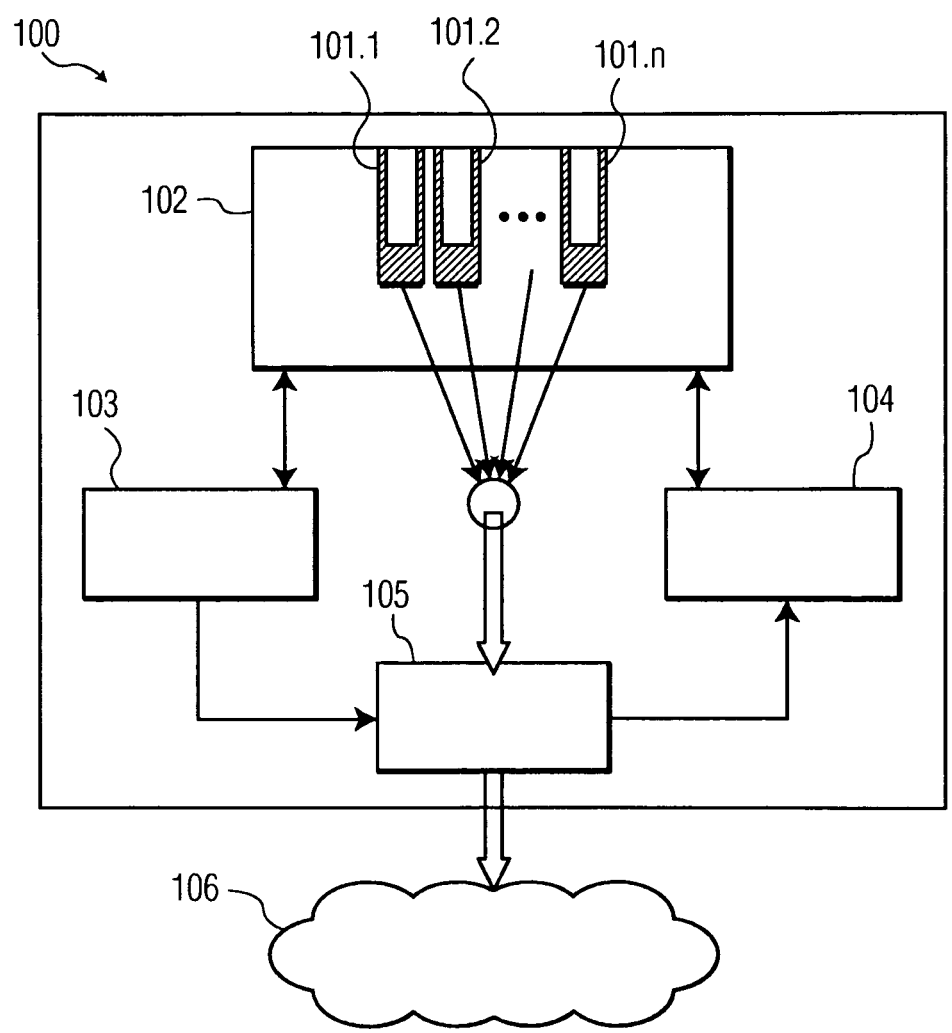
FIG. 1 illustrates a simplified block diagram of a wireless device modified according to an embodiment of the present invention.

A wireless device 100 modified according to the present invention may include a system with an architecture that is illustrated in the block diagram of FIG. 1. Each wireless device 100 may include a memory 102 comprising n queues 101.1-101.n that are assigned flows and weights by a time monitor 104. The time monitor 104 keeps track of the per-byte transmission time experienced by each queue and adjusts the queue's weight and retry limit as well as transmission opportunity (TXOP) accordingly. The device further comprises a queue-level scheduler 103 that uses the weights to schedule packets enqueued in the various queues for transmission by the wireless transmission module 105 over the wireless channel 106.

Figure 3:
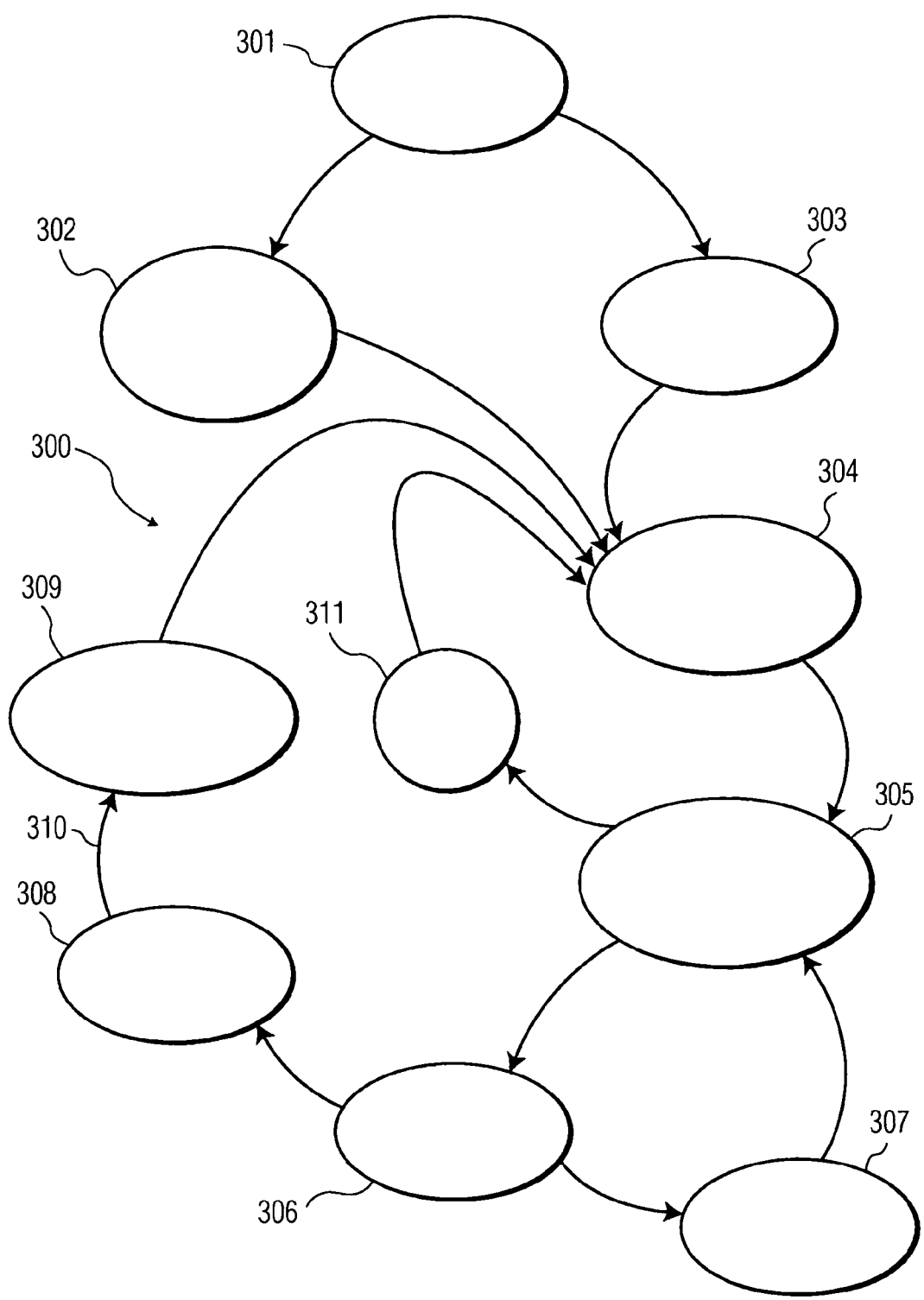
FIG. 3 illustrates an FSD diagram of the method of the present invention.

Referring now to FIG. 3, in a preferred embodiment, a flow declares its needs to a device 100 at state 301 and each delay-sensitive traffic flow (video, voice, audio) is assigned to a separate queue i 101.i stored in memory 102 of the device 100 which bounds the delay per flow, whereas all non-delay-sensitive traffic flows are optionally bundled into a single queue at state 303 without negatively affecting the performance (fairness characteristic) of the NT-AirFair (Non-TSPEC AirFair) allocation scheme of the system and method of the present invention. Each queue is assigned a weight $q_{i,old}=q_{i,new}$ at state 302. Thereafter, when packets of a flow are received they are enqueued at state 304 in the appropriate queue that was established when the flow was admitted and scheduled by a queue-level scheduler 103 in accordance with their pre-assigned weights. However, in the system and method of the present invention the weights are dynamically adjusted to reflect link conditions while retaining the fairness of the medium allocation.

The NT-Airfair modification to a wireless device 100 of the present invention works together with an existing queue-level scheduler 103 that performs weighted scheduling on a per flow basis, as illustrated in FIG. 1. The existing queue-level scheduler 103 can be located in an operating system kernel, a wireless device driver, or the MAC. The device is further configured with a time monitor module 104 that computes window-averaged transmit time per byte, tracks increases in this average time, adjusts each of the weights, retries limit and TXOP accordingly as well as performs all the other computations necessary for implementing the present invention. At state 305, when packets are available for transmission the next packet to be transmitted is determined by the queue-level scheduler using an existing weighted priority scheme. Typically, the queue-level scheduler employs a separate queue for each of n different traffic flows i and assigns different weights $q_i$, i=1, ..., n, to the queues for advanced queuing algorithms such as weighted round-robin and weighted fair queuing, both of which are based on priority queuing. However, in a preferred embodiment the weights are adjusted in accordance with the system and method of the present invention and are not static, as they are in many prior art priority queuing schemes.

In priority queuing, each arriving packet is placed into a queue based on its priority which may be, e.g., high, medium, norm, and low. Higher priority queues are preferred, i.e., packets in higher-priority queues are preferred for transmission and lower-priority queues gain access to the medium only when no higher-priority queues have packets waiting for transmission. Thus, higher priority queues get serviced at the expense of lower-priority queues and the latter experience delivery delays and even failure in such a scheme.

Weighted round robin makes sure that no queue dominates at the expense of others. Weighted round robin queuing transmits entire queues in round-robin order with a priority being assigned to a queue, i.e., by defining the queue's length. Thus, the longer the queue, the higher the queue's priority. Weighted round robin processes more high-priority traffic and treats low-priority traffic fairly.

A more comprehensive scheme that fairly handles both heavy and light traffic is weighted fair queuing (WFQ), which uses flow-based queuing to dynamically allocate a proportionate part of link bandwidth to each flow, i.e., proportionate to its priority level. That is, WFQ is a combination of (1) per-flow queuing and (2) weighted round-robin scheduling.

In a TSPEC-based air-fair scheme, the TSPECs for traffic flows are used to calculate the queue weights. A module in the device driver measures the consumed airtime for each traffic flow. The dequeuing module uses this information together with the weights to enforce airtime allocation by adjusting the queue weights.

In a preferred embodiment that does not use TSPECs, NT-AirFair of the present invention, it is assumed that each flow i has been assigned an initial weight $q_{i,old} = q_{i,new}$ and a window size t has been pre-determined. Then, after data is transmitted at state 306 the transmission time per byte of data (including retransmission time) is tracked at state 308 over consecutive windows of size t to produce a sequence $T_{i,j}$ for each traffic flow i over time t:

$T_{i,j}$=transmission_time_consumed/packet_size, for j=1, 2, ..., and i=1, ..., n.

In another aspect, measuring the normalized transmission time excludes the airtime consumed by MAC and PHY (physical layer) overhead to reflect more accurately the underlying link condition:

$T_{i,j}$=(transmission_time_consumed—MAC_header_overhead_time)/packet_size, for j=1, 2 ...

This applies only with varying PHY wherein overhead_time is the major cause of long transmission time. Thus the time complexity of the NT AirFair of the present invention is low.

If the sequence $T_{i,j}$ increases, on a windowed-average basis, by more than a pre-determined threshold, the queuing weight $q_{i,new}$ a for traffic flow i is adjusted at state 309 to lower its priority in dequeuing the corresponding enqueued packets of the flow i relative to all other traffic flows. A preferred embodiment adjusts the queue weight inversely proportionally to the airtime increase:

$q_{i,new} = q_{i,old} * (T_{i,old}/T_{i,new})$.

The window size t for the averaging must be large enough to effectively eliminate the impact of sporadic fluctuations in the link condition, while small enough to enable quick response to link degradation.

In priority-based MAC, it is most likely that delay-sensitive traffic flows per flow category are bundled into one queue in the device driver and the MAC. Because packets held up in a queue will block subsequent packets in the same queue, it is impractical, if not impossible, to differentiate among traffic flows heading to different stations in the dequeuing process. A non-dequeuing-based differentiating mechanism is therefore needed for priority-based MAC.

In all embodiments, a normalized transmission time per byte $T_{i,t,j}$ is measured and tracked. If the transmission time for a particular flow is detected to have increased beyond a certain pre-determined threshold at state 308, the retry limit for the packet and the flow is lowered or set to 0 to prevent the flow's packets from repeatedly trying to access the channel and thus blocking packets from other flows. Retry limits for non-offending flows are not changed. The previous "allowed" transmission time is also used to determine the minimum PHY rate under the new retry limit at state 309, to prevent the link adaptation module from setting the PHY rate too low, resulting in the flow continuing to consume too much airtime.

In all embodiments, when packet transmission fails, TXOP is adjusted at state 3077 and transmission is retried at state 305. When the retry limit is exceeded, i.e., the queued packet is dropped at state 311 so that when the retry limit is exhausted packets are prevented from piling up in queues.

In conjunction with resetting the retry limit at state 310, TXOP can also be set to the "allowed" airtime for each flow. Because a single queue can hold packets for different traffic flows, the TXOP needs to be estimated and reset on a per-packet basis.

In preferred embodiments, Non-TSPEC AirFair (or NT-AirFair) can be implemented in alternative parts of the protocol stack such as:
  in the queuing module of the operating system kernel;
  the wireless device driver; and
  the MAC.

Figure 2:
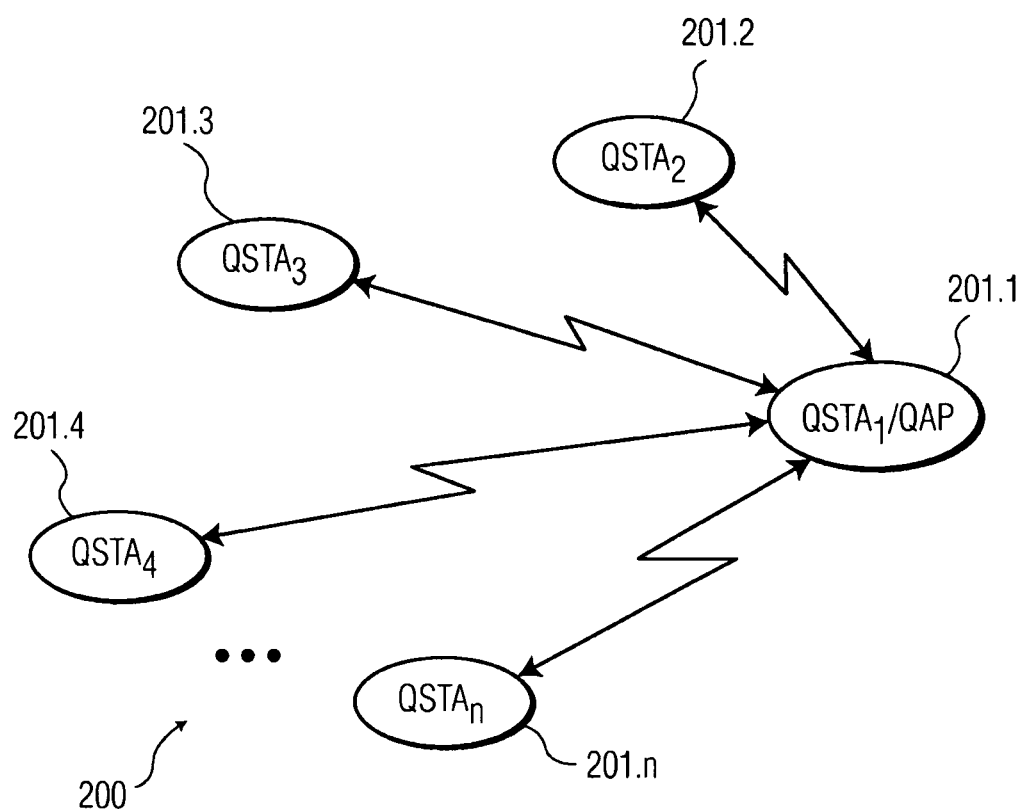
FIG. 2 illustrates a wireless communication network of devices each modified according to the present invention.

Referring now to FIG. 2, NT-AirFair, according to the present invention, can be performed by both access points (that coordinate stations) 201.1 and stations 201.2-201.n of a wireless network 200 in which each device or station 201.i is additionally configured with an apparatus (100) as illustrated in FIG. 1, in accordance with the present invention.

The invention can be applied to Wireless LAN (802.11) IC, wireless PAN IC; wireless video servers and receivers, wireless media adapters, media PCs, and wireless video transmission modules.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation, such as dynamically adjusting the window size based on the link condition, and the teaching of the present invention can be adapted in ways that are equivalent without departing from its central scope. Therefore it is intended that the present invention not be limited to the particular embodiment disclosed as the best mode contemplated for carrying out the present invention, but that the present invention include all embodiments falling within the scope of the appended claims.

What is claimed is:

1. An apparatus for non-TSPEC (traffic specification) air-time fair transmission control regulation, comprising:
   a memory comprising n queues having corresponding pre-determined scheduling weights $q_{i,old}=q_{i,new}$, i=1, 2, ..., n, where n is an integer more than 1;
   a queue-level scheduler to enqueue a received packet and dequeue for transmission an enqueued packet of at least one flow in a queue of said n queues respectively according to a pre-determined queue allocation scheme and a weighted transmission scheduling scheme using said weights $q_{i,new}$, i=1, 2, ..., n; and
   a time monitor module to track at least a per-byte transmission time of at least one of the n queues and to determine for determining if there is an increase in a transmission time per byte $T_{i,t,j}$ for each queue of said at least one flow enqueued therein and adjusting the corresponding scheduling weights $q_{i,new}$, i=1, 2, ..., n according to a pre-determined weight adjustment scheme if the per-byte transmission time of the at least one of the n queues exceeds a threshold.

2. The apparatus of claim 1, further comprising:
   a priority-based MAC;
   said queue-level scheduler is contained in one of the components selected from a group consisting of a queuing module of an operating system kernel, a device driver, and a MAC; and
   wherein delay-sensitive traffic flows per flow category are enqueued in a separate queue per flow by the queue-level scheduler.

3. The apparatus of claim 1, wherein the time monitor computes $T_{i,t,j}$ as a window-averaged transmission time per byte for a pre-determined window size t.

4. The apparatus of claim 1, wherein said allocation scheme comprises enqueuing each delay-sensitive flow in a separate queue of said n queues.

5. The apparatus of claim 4, wherein the time monitor computes $T_{i,t,j}$ as a window-averaged transmission time per byte for a pre-determined window size t.

6. The apparatus of claim 1, wherein said allocation scheme comprises enqueuing all non-delay-sensitive flows in a single separate queue of said n queues.

7. The apparatus of claim 6, wherein the time monitor computes $T_{i,t,j}$ as a window-averaged transmission time per byte for a pre-determined window size t.

8. The apparatus of claim 1,
   wherein said allocation scheme comprises enqueuing each delay-sensitive flow and all non-delay-sensitive flows in a separate queue of said n queues,
   wherein the time monitor computes $T_{i,t,j}$ as a window-averaged transmission time per byte for a pre-determined window size t, and
   wherein the weighted transmission scheduling scheme is selected from a group consisting of weighted round-robin and weighted fair queuing.

9. The apparatus of claim 8, wherein
   $T_{i,t,j}$=transmission_time_consumed/packet_size, for j=1, 2, ..., and i=1, ..., n; and
   the pre-determined weight adjustment scheme obtains a sequence $T_{i,t,j}$ for j=1, ... k over the window t and, if this sequence increases, on a window-averaged basis by more than a pre-determined threshold, adjusts the queue weight inversely proportionally to the increase.

10. The apparatus of claim 9, wherein the queue weight is adjusted according to the formula:

$$q_{i,new}=q_{i,old}*(T_{i,old}/T_{i,new}).$$

11. The apparatus of claim 9, wherein the pre-determined weight adjustment scheme further comprises an adjustment to the retry limit for the flow and determination of a minimum PHY rate under the adjusted retry limit.

12. The apparatus of claim 11, wherein the pre-determined weight adjustment scheme further comprises setting TXOP to a pre-determined allowed airtime.

13. The apparatus of claim 11, wherein the adjustment is selected from a group consisting of lowering the retry limit by a pre-determined lowering amount and setting the retry limit to 0.

14. The apparatus of claim 13, wherein the pre-determined weight adjustment scheme further comprises setting TXOP to a pre-determined allowed airtime, and wherein the apparatus is selected from a group consisting of an IEEE 802.11 wireless local area network (LAN) integrated circuit (IC), a wireless personal area network (PAN) IC, a wireless video server, a wireless video receiver, a wireless media adapter, a media personal computer (PC), and a wireless video transmission module.

15. A communications network for non-TSPEC (traffic specification) air-time fair transmission control regulation comprising a plurality of devices each including an apparatus according to claim 14.

16. A method for non-TSPEC (traffic specification) air-time fair transmission control regulation, comprising:
   providing n queues each having a corresponding pre-determined scheduling weight qi, old=qi, new, i=1, 2, ..., n, where n is an integer more than 1;
   enqueuing a received packet of at least one flow in a separate queue of said n queues according to a pre-determined queue allocation scheme;
   dequeuing for transmission an enqueued packet in accordance with a weighted transmission scheduling scheme using said weights qi, new, i=1, 2, ..., n;
   tracking at least a per-byte transmission time of at least one of the n queues; determining if there is an increase in a transmission time per byte Tij for each queue;
   and
   adjusting the corresponding scheduling weights qi, new, i=1, 2, ..., n according to a predetermined weight adjustment scheme if the per-byte transmission time of the at least one of the n queues exceeds a threshold.

17. The method of claim 16, further comprising:
   providing a priority-based MAC; and
   the enqueuing further comprises enqueuing delay-sensitive traffic flows per flow category in a separate queue per flow in one of the components selected from a group consisting of a queuing module of an operating system kernel, a device driver, and a MAC.

18. The method of claim 16, wherein the determining further comprises computing $T_{i,j}$ as a window-averaged transmission time per byte for a pre-determined window size t.

19. The method of claim 16, wherein said queue allocation scheme comprises allocating each delay-sensitive flow to a separate queue of said n queues.

20. The method of claim 19, wherein the determining further comprises computing $T_{i,j}$ as a window-averaged transmission time per byte for a pre-determined window size t.

21. The method of claim 16, wherein said queue allocation scheme comprises allocating all non-delay-sensitive flows to a single separate queue of said n queues.

22. The method of claim 21, wherein the determining further comprises computing $T_{i,j}$ as a window-averaged transmission time per byte for a pre-determined window size t.

23. The method of claim 16, wherein said allocation scheme comprises:
   allocating each delay-sensitive flow to a separate queue of said n queues; and
   allocating all non-delay-sensitive flows to a separate queue of said n queues.

24. The method of claim 23, wherein the determining further comprises computing $T_{i,j}$ as a window-averaged transmission time per byte for a pre-determined window size t.

25. The method of claim 23, wherein
   the weighted transmission scheduling scheme is selected from a group consisting of weighted round-robin and weighted fair queuing, and
   $T_{i,t,j}$=transmission_time_consumed/packet_size, for j=1, 2, . . . , and i=1, . . . , n; and
   the pre-determined weight adjustment scheme comprises:
      i. obtaining a sequence $T_{i,j}$ for j=1, . . . , k over the window t; and
      ii. determining if the obtained sequence increases, on a window-averaged basis by more than a pre-determined threshold; and
      iii. when the increase exceeds the threshold, adjusting the queue weight inversely proportionally to the increase.

26. The method of claim 25, wherein the adjusting the queue weight uses the formula: qi, new=qi, old (Ti, old/Ti, new).

27. The method of claim 25, wherein the pre-determined weight adjustment scheme further comprises:
   adjusting the retry limit; and
   determining a minimum PHY rate under the adjusted retry limit.

28. The method of claim 27, wherein the pre-determined weight adjustment scheme further comprises setting TXOP to a pre-determined allowed airtime.

29. The method of claim 27, wherein the adjusting the retry limit comprises selecting an adjustment from a group consisting of lowering the retry limit by a pre-determined lowering amount and setting the retry limit to 0.

30. The method of claim 29, wherein the pre-determined weight adjustment scheme further comprises setting TXOP to a pre-determined allowed airtime.

* * * * *